United States Patent
Shin et al.

(10) Patent No.: US 8,743,915 B2
(45) Date of Patent: Jun. 3, 2014

(54) METHOD AND APPARATUS FOR TRANSMITTING PACKET IN OPTICAL TRANSPORT NETWORK

(75) Inventors: Jong-Yoon Shin, Daejeon (KR); Jongho Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 240 days.

(21) Appl. No.: 13/110,420

(22) Filed: May 18, 2011

(65) Prior Publication Data

US 2011/0286744 A1    Nov. 24, 2011

(30) Foreign Application Priority Data

May 18, 2010    (KR) ........................ 10-2010-0046244
May 17, 2011    (KR) ........................ 10-2011-0046107

(51) Int. Cl.
 *H04J 3/02*    (2006.01)
 *H04J 14/00*   (2006.01)
 *H04J 3/16*    (2006.01)

(52) U.S. Cl.
 CPC .................................. *H04J 3/1611* (2013.01)
 USPC ............................................ 370/539; 398/45

(58) Field of Classification Search
 USPC .............. 370/535–545, 470–472; 398/45–50, 398/52–53, 55–60, 67–72, 74–79, 89–99
 See application file for complete search history.

(56) References Cited

U.S. PATENT DOCUMENTS

| | | | |
|---|---|---|---|
| 7,742,502 B2 | 6/2010 | Vissers et al. | |
| 2003/0120799 A1* | 6/2003 | Lahav et al. | 709/236 |
| 2006/0104309 A1* | 5/2006 | Vissers et al. | 370/474 |
| 2007/0076769 A1* | 4/2007 | Zou | 370/539 |
| 2007/0104485 A1 | 5/2007 | Zhang | |
| 2008/0107418 A1* | 5/2008 | Zhang | 398/98 |
| 2008/0219661 A1* | 9/2008 | Lanzone et al. | 398/45 |
| 2010/0189433 A1* | 7/2010 | Trojer | 398/8 |
| 2011/0008050 A1* | 1/2011 | Ceccatelli et al. | 398/79 |
| 2011/0150468 A1* | 6/2011 | Uchida et al. | 398/45 |
| 2011/0170864 A1* | 7/2011 | Tani et al. | 398/43 |

FOREIGN PATENT DOCUMENTS

| | | |
|---|---|---|
| CN | 1734986 | 2/2006 |
| CN | 1734990 | 2/2006 |
| CN | 1741429 | 3/2006 |
| CN | 1773898 | 5/2006 |
| WO | 2009/083277 A1 | 7/2009 |

* cited by examiner

*Primary Examiner* — Thai Hoang
(74) *Attorney, Agent, or Firm* — Nelson Mullins Riley & Scarborough LLP

(57) ABSTRACT

A method of transmitting a packet in an optical transport network includes: generating a GFP frame by GFP encapsulating a packet client signal; mapping the GFP frame to a dynamic data unit; multiplexing to a high order data unit in an order higher than that of the dynamic data unit using at least one dynamic data unit; generating a high order transport unit using the multiplexed high order data unit; and transmitting the high order transport unit.

3 Claims, 17 Drawing Sheets

FIG. 1

Column #

| | 1 | .... | 14 | 15 | 16 | 17 | | 3824 | 3825 | .... | 4080 |

Row #
1: FA OH | OTUk OH
2-4: ODUk OH | OPUk OH | OPUk payload (4x3808 bytes) | Parity byte FIG. 2A
(a)
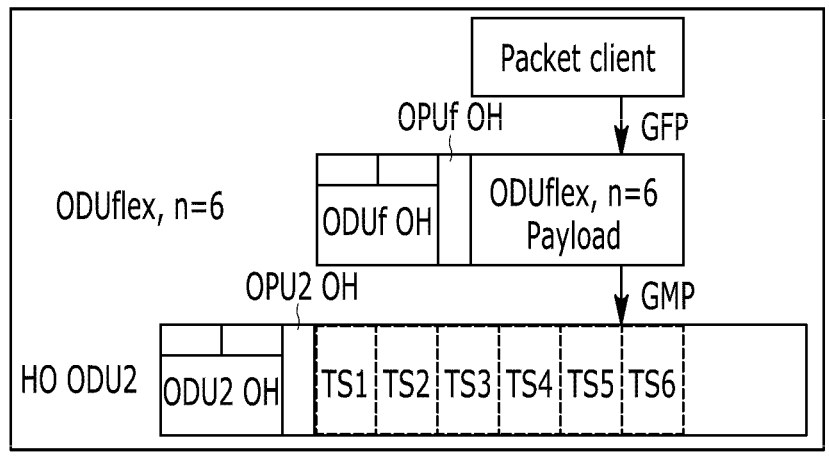
(b)
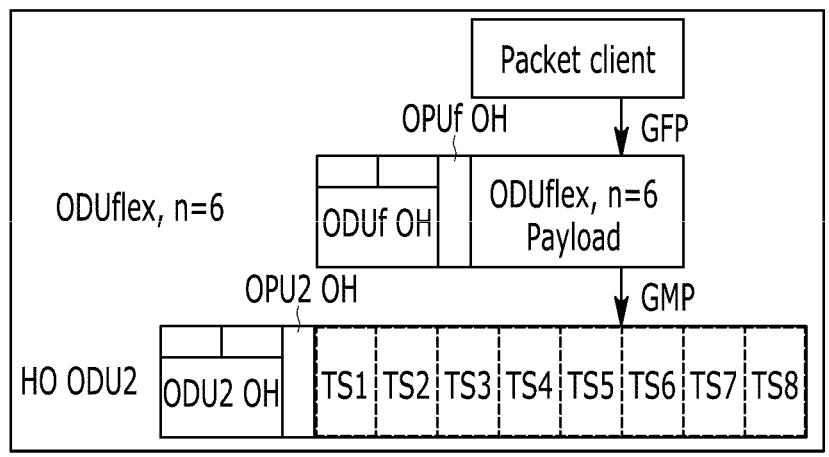
①

FIG. 2B
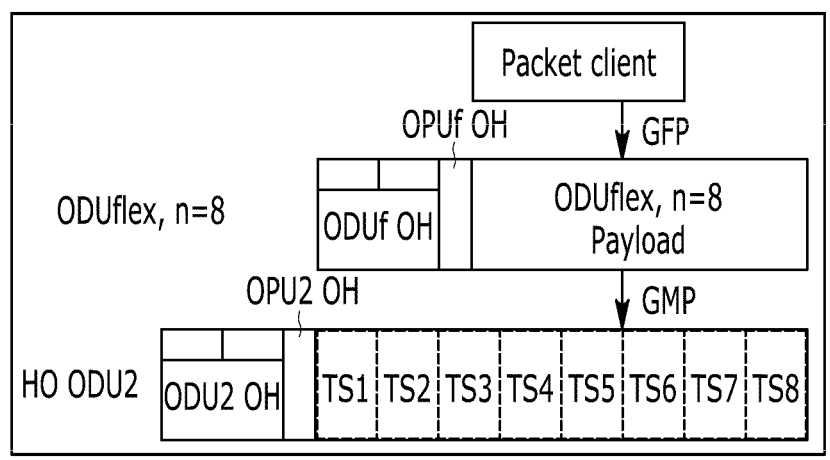
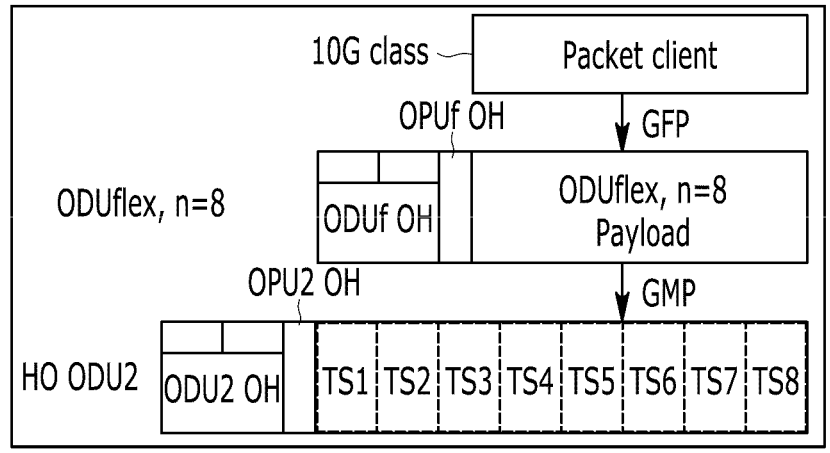

FIG. 3
(a)
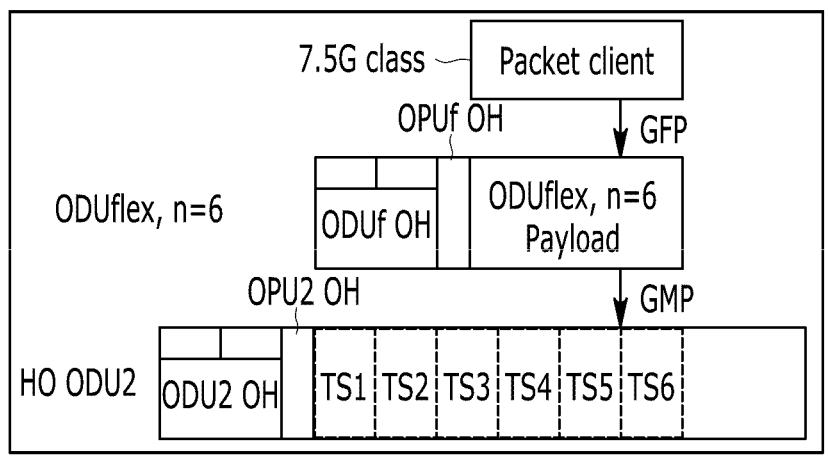
(b)
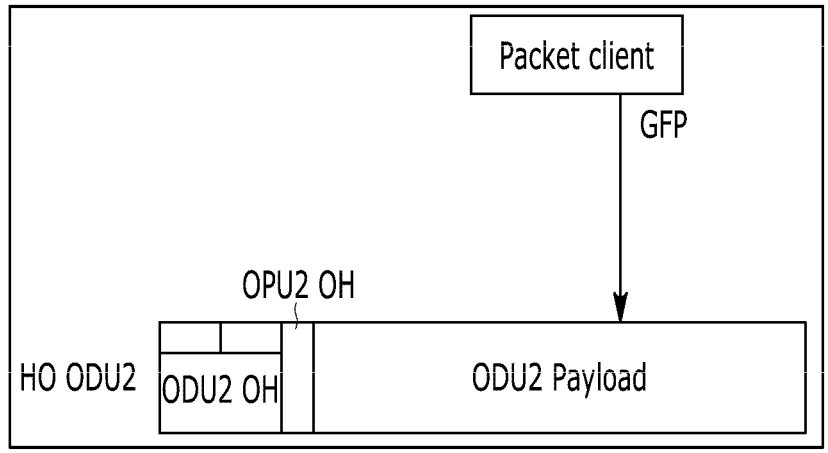
(c)
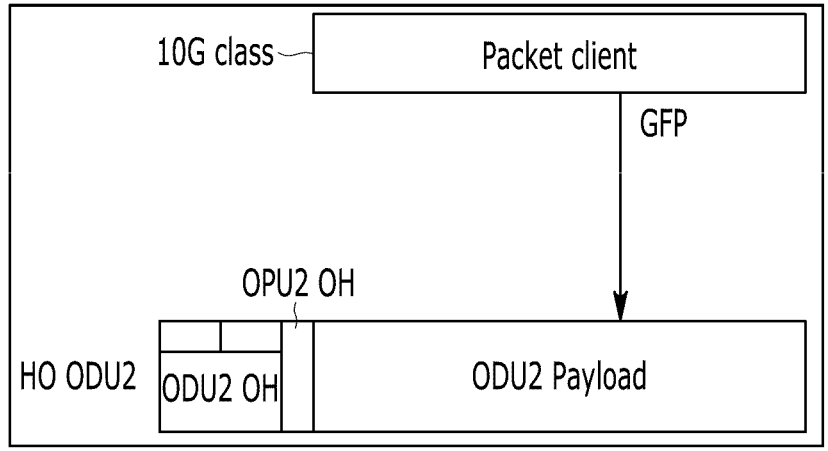

FIG. 4A
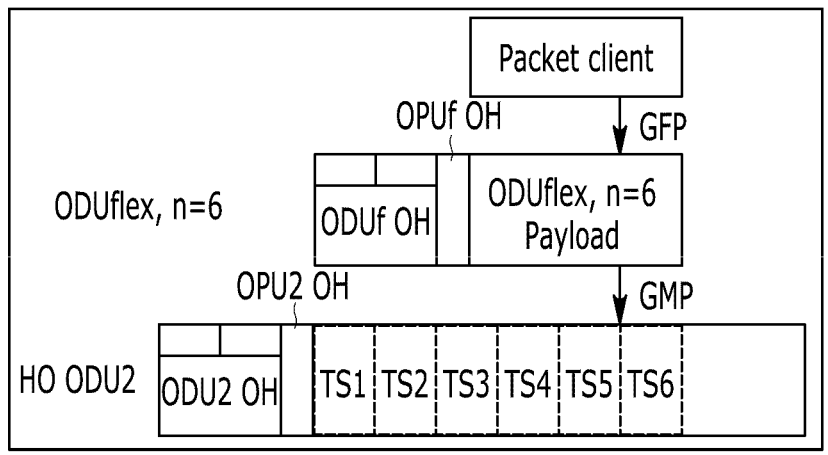
(a)
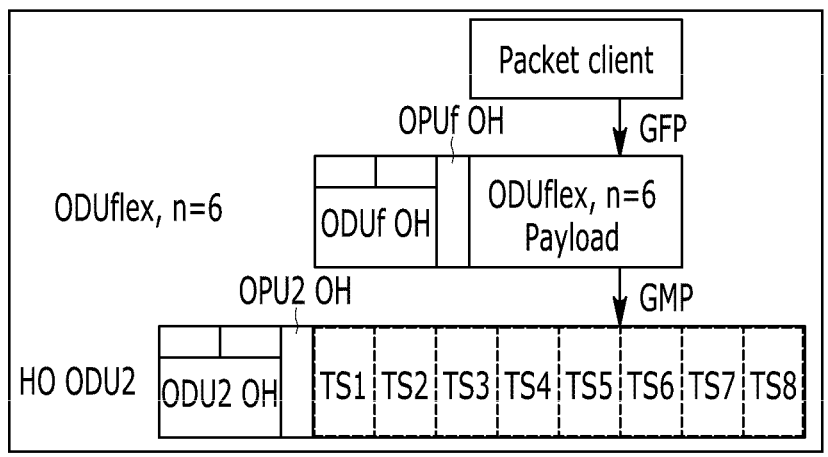
(b)
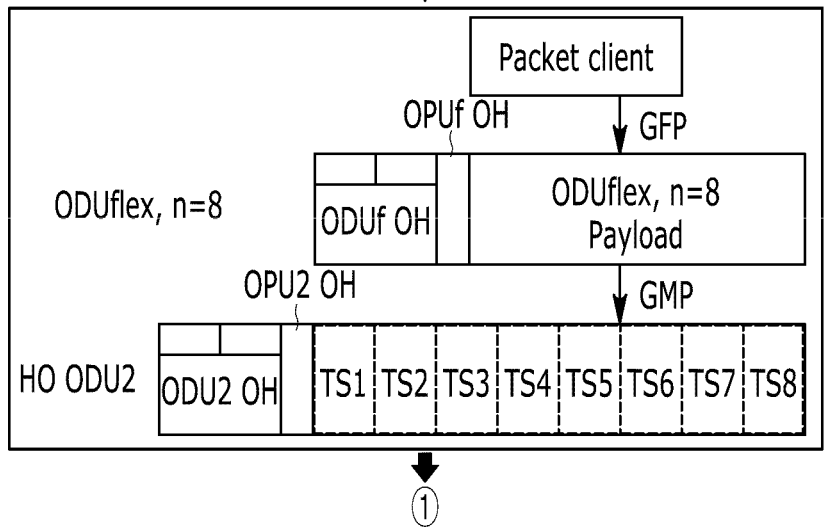
(c)

FIG. 4B
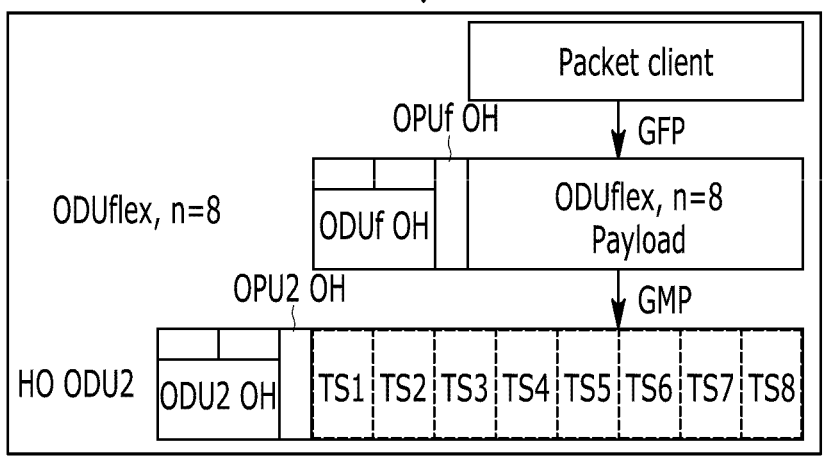
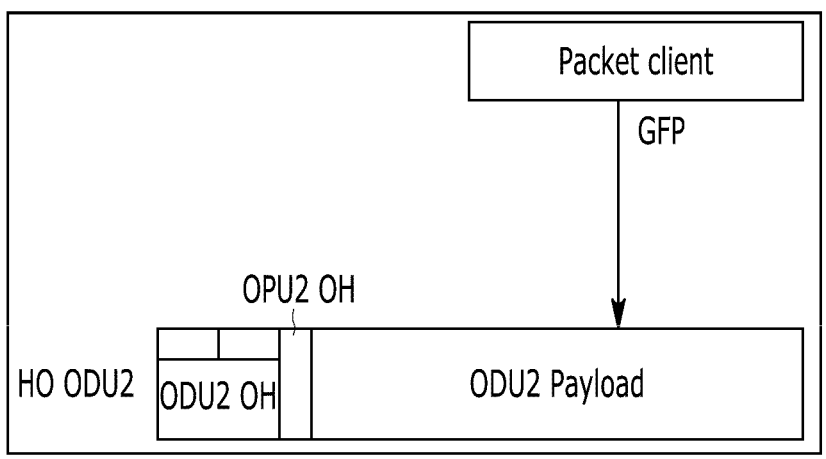
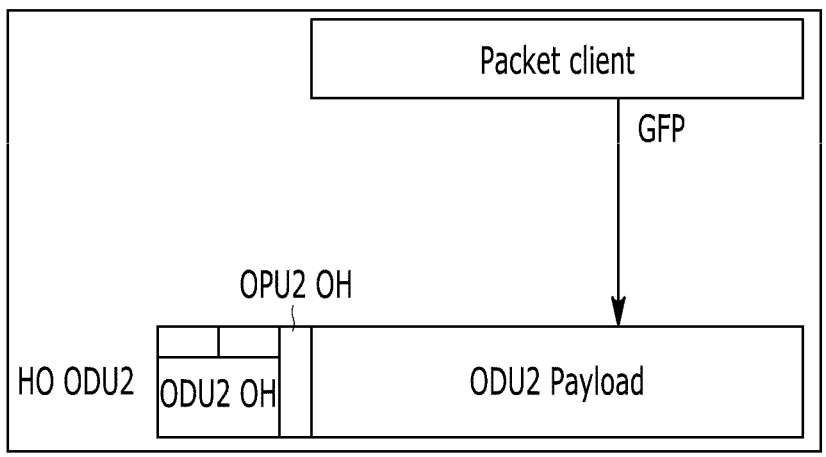

FIG. 5A
(a)
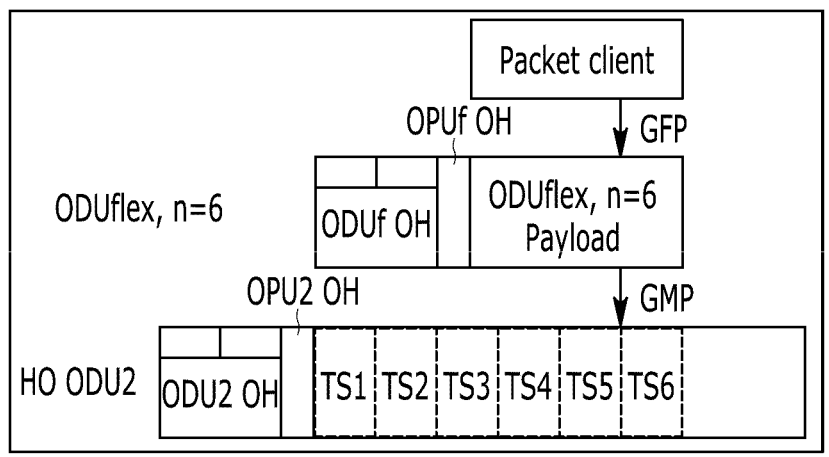
(b)
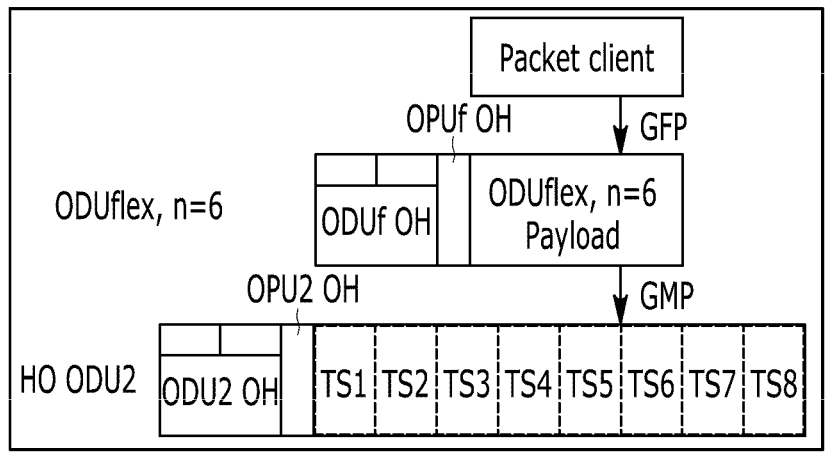
(c)
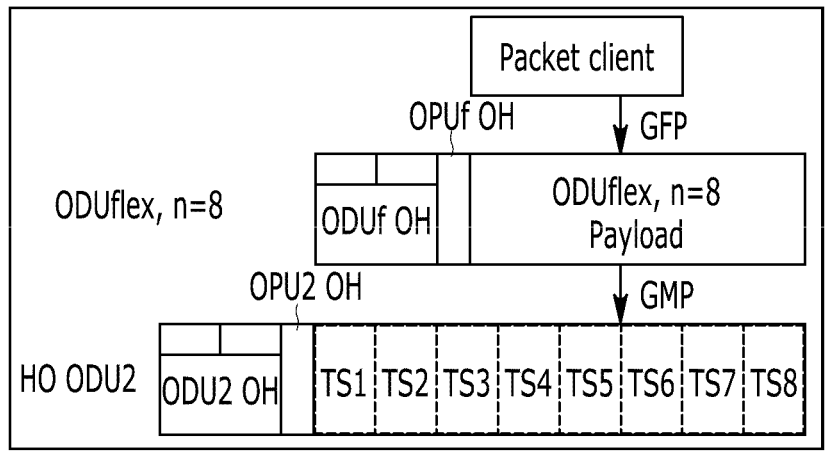
①

FIG. 5B
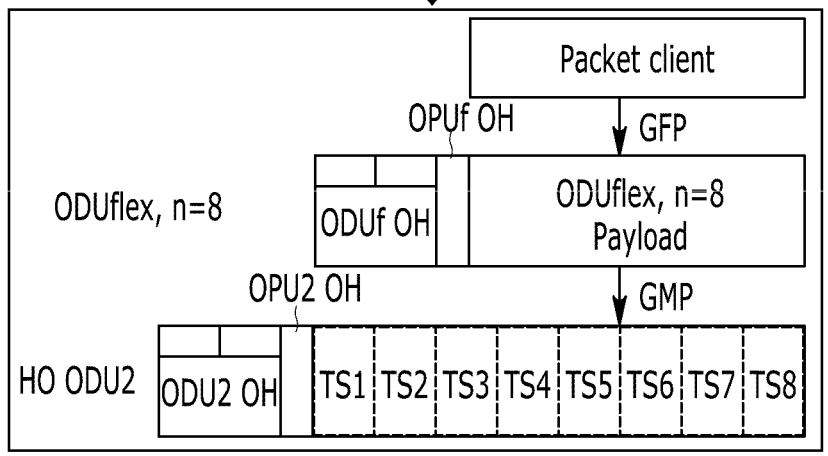
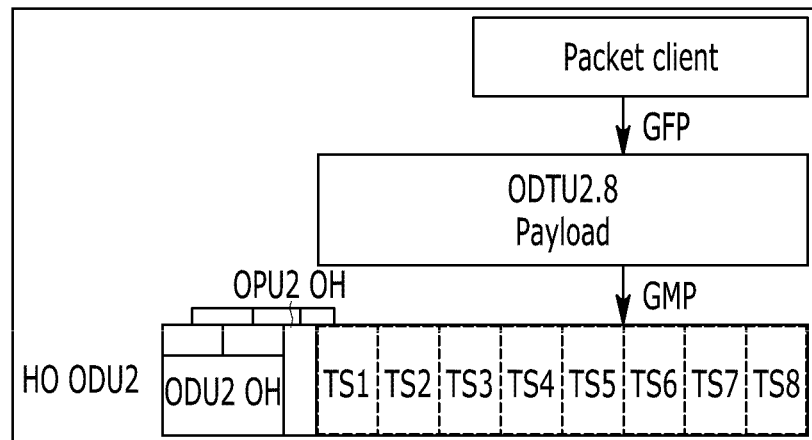
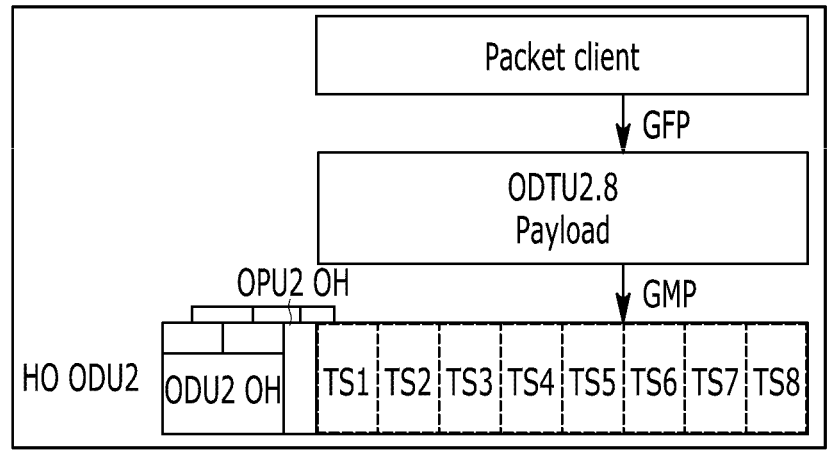

FIG. 6

OPU-k OH

|   | 15 | 16 |
|---|----|----|
| 1 | J4 | J1 |
| 2 | J5 | J2 |
| 3 | J6 | J3 |
| 4 | PSI | RES/OMFI |

| | Fifteenth column (resizing protocol) | | | | | | | |
|---|---|---|---|---|---|---|---|---|
| | 1 | 2 | 3 | 4 | 5 | 6 | 7 | 8 |
| 1 | RP | OR | RES | ODUflex Link Connection | | | | |
| 2 | ODUflex rate resizing | | | ODUflex Link Connection | | | | |
| 3 | CRC-3 | | | CRC-5 | | | | |

METHOD AND APPARATUS FOR TRANSMITTING PACKET IN OPTICAL TRANSPORT NETWORK

CROSS-REFERENCE TO RELATED APPLICATION

This application claims priority to and the benefit of Korean Patent Application No. 10-2010-0046244 and 10-2011-0046107 filed in the Korean Intellectual Property Office on May 18, 2010 and May 17, 2011, the entire contents of which are incorporated herein by reference.

BACKGROUND OF THE INVENTION (a) Field of the Invention

The present invention relates to a method and apparatus for transmitting a packet in an optical transport network.

(b) Description of the Related Art

An optical transport network performs forward error correction (hereinafter, referred to as 'FEC') to enhance a transmission performance. In order to stably transmit a high speed signal that provides a high bandwidth in the optical transport network, ITU-T G.709 defines an optical channel transport unit (OTUk) and an optical channel data unit (ODUk) (k=1, 2, 3, 4). An OTUk includes an ODUk corresponding to information data including an optical channel payload unit (OPUk) and a parity byte for correcting an error of the ODUk. An area corresponding to the ODUk is referred to as an in-band area, and an area corresponding to the parity byte is referred to as an out-band area.

FIG. 1 is a diagram illustrating an example of the OTUk.

Referring to FIG. 1, the OTUk is formed with total 4 rows, and overheads are positioned at a first column to a sixteenth column. Overheads (FA OH) for aligning a frame are positioned at a first column to a seventh column of a first row, OTUk overheads are positioned at an eighth column to a fourteenth column of a first row, ODUk overheads are positioned at a first column to a fourteenth column of a second row to a fourth row, and overheads of the OPUk are positioned at a fifteenth column to a sixteenth column of entire rows.

OPUk payloads are positioned at a seventeenth column to a 3824th column (4*3808 bytes) of entire rows, and parity bytes for correcting an error are positioned at a 3825th column to a 4080th column (4*256 bytes) of entire rows.

An OTU1 has a bit rate of about 2.666 Gbit/s, an OTU2 has a bit rate of about 10.709 Gbit/s, an OTU3 has a bit rate of about 43.018 Gbit/s, and an OTU4 has a bit rate of about 111.8 Gbit/s.

In order to freely house a packet client signal while increasing a transmission efficiency in the optical transport network, a flexible ODU (ODUflex) signal is defined. The ODUflex signal includes, for example, ODUflex (GFP) for housing a packet client signal such as Internet Protocol version 4 (IPv4), Internet Protocol version 6 (IPv6), Multi Protocol Label Switching (MPLS), and Ethernet. The ODUflex (GFP) is a signal that encapsulates a packet client signal with a generic framing procedure (GFP) and that then GFP maps the packet client signal to an ODUflex payload and that adds an ODUflex overhead to the packet client signal. The ODUflex (GFP) can be multiplexed to a high order ODUk (HO ODUk) (k=2, 3, 4) of an order higher than the ODUflex (GFP) through a generic mapping procedure (GMP). In an ODU2, an ODU0, an ODU1, and an ODUflex are lower order ODUs. In an ODU0, an ODU1, and an ODU, an ODU2, an ODU3, and an ODU4 are high order ODUs.

In this case, a method and apparatus for transmitting a packet that can dynamically adjust a packet transport amount without packet damage is necessary.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for transmitting a packet having advantages of transmitting a packet without packet damage in an optical transport network.

An exemplary embodiment of the present invention provides a method of transmitting a packet in an optical transport network, the method including: generating a GFP frame by GFP encapsulating a packet client signal; mapping the GFP frame to a dynamic data unit; multiplexing to a high order data unit in an order higher than that of the dynamic data unit using at least one dynamic data unit; generating a high order transport unit using the multiplexed high order data unit; and transmitting the high order transport unit.

Another embodiment of the present invention provides a method of transmitting a packet in an optical transport network, the method including: increasing the number of tributary slots of a high order data unit for transmitting a packet client signal; increasing a transport capacity of the packet client signal by the increased number of tributary slots; and transmitting the packet client signal through the high order data unit.

Yet another embodiment of the present invention provides a method of transmitting a packet in an optical transport network, the method including: generating a high order transport unit using a high order data unit in an order higher than that of a dynamic data unit; extracting a high order data unit from the high order transport unit; extracting a lower order data unit in an order lower than that of the high order data unit from a tributary slot of the high order data unit; switching a unit of a data unit using the extracted lower order data unit; mapping the switched data unit to the tributary slot of the high order data unit; and generating and transmitting a high order transport unit from the mapped high order data unit.

Yet another embodiment of the present invention provides a packet transport apparatus in an optical transport network, the packet transport apparatus including: a first frame generator that maps a packet client signal to a dynamic data unit; a multiplexer that multiplexes to a high order data unit in an order higher than that of the dynamic data unit using at least one dynamic data unit; and a second frame generator that generates a high order transport unit using the multiplexed high order data unit, wherein the first frame generator includes a GFP processor that generates a GFP frame by GFP encapsulating the packet client signal; and a dynamic data unit generator that maps the GFP frame to the dynamic data unit and that adds an overhead to the dynamic data unit.

According to an exemplary embodiment of the present invention, even when a packet transport capacity increases in an optical transport network, a packet can be hitlessly transmitted without packet damage.

BRIEF DESCRIPTION OF THE DRAWINGS

FIG. 1 is a diagram illustrating an example of an OTUk.

FIG. 2A and FIG. 2B are a diagram illustrating an example of a method of resizing an ODUflex (GFP), n=6 to an ODUflex (GFP), n=8.

FIG. 3 is a diagram illustrating a method of transmitting a packet according to an exemplary embodiment of the present invention.

FIG. 4A and FIG. 4B are a diagram illustrating a method of transmitting a packet according to another exemplary embodiment of the present invention.

FIG. 5A and FIG. 5B are a diagram illustrating a method of transmitting a packet according to another exemplary embodiment of the present invention.

FIG. 6 is a diagram illustrating a structure of an OPUk overhead for a HO ODU (GFP) hitless resizing protocol according to an exemplary embodiment of the present invention.

DETAILED DESCRIPTION OF THE EMBODIMENTS

Figure 7:
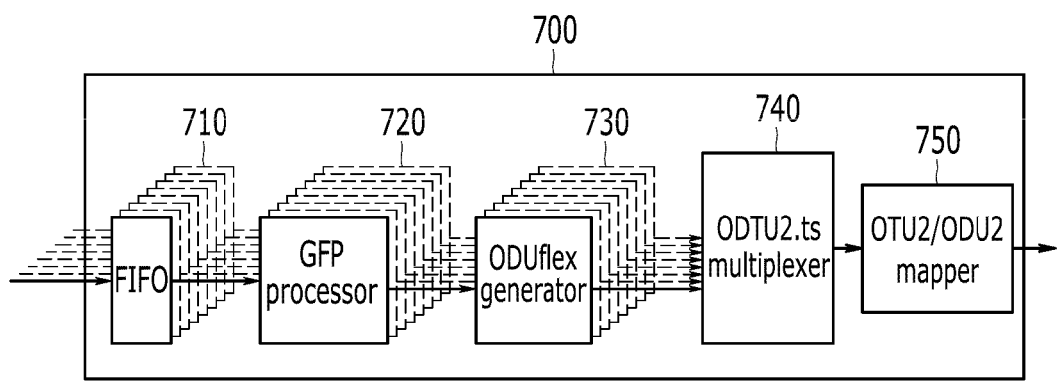
FIG. 7 is a block diagram illustrating a configuration of a packet transport apparatus using an ODUflex (GFP).

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in an entire specification, unless explicitly described to the contrary, the word "comprise" and variations such as "comprises" or "comprising", will be understood to imply the inclusion of stated elements but not the exclusion of any other elements.

In an entire specification, a packet client signal can be used together with a client signal, a packet signal, a packet, a packet client, etc.

Table 1 illustrates bit rates and a tolerance when multiplexing an ODUflex (GFP) to a HO ODU2.

TABLE 1

| Originating Server type | ODUflex(GFP) nominal bit rate (note 1) | Default and maximum $C_m$ | ODUflex bit rate tolerance |
|---|---|---|---|
| HO ODU2 | $476/3824 \times n \times C_m / 15232 \times$ ODU2 bit rate | 15230 15165 | ±20 ppm |
| HO ODU3 | $119/3824 \times n \times C_m / 15232 \times$ ODU3 bit rate | | |
| HO ODU4 | $47.5/3824 \times n \times C_m / 15200 \times$ ODU4 bit rate | 14587 | |

NOTE 1
The value "n" represents the number of tributary slots occupied by the ODUflex(GFP) and $C_m$ represents the number of M-byte ODUflex entities per HO ODUk multiframe.

where n is the number of tributary slots that are occupied by an ODUflex (GFP) in tributary slots of a HO ODUk, and Cm is the number of M bytes to which ODUflex (GFP) data per multiframe of the HO ODUk are mapped.

Because the HO ODU2 includes 8 tributary slots, n is maximum 8, and when n is maximum 8, M is 8. Because the HO ODU3 includes 32 tributary slots, n is maximum 32, and when n is maximum 32, M is 32. Because the HO ODU4 includes 80 tributary slots, n is maximum 80, and when n is maximum 80, M is 80.

Therefore, a bit rate of an ODUflex (GFP), n=8 that can occupy 8 tributary slots in the HO ODU2 is about 9,993,965 kbit/s (=476/3824×8×15230/15232×239/237×9,953,280 kbit/s). A bit rate of a payload of the ODUflex (GFP), except for an overhead in the ODUflex (GFP) is 238/239×ODUflex bit rate and is about 9,952,149 kbit/s (=238/239×476/3824× 8×15230/15232×239/237×9,953,280 kbit/s).

Table 2 represents a medium access control (MAC) bit rate that can be transmitted to a payload of the ODUflex (GFP).

TABLE 2

| | | | BPayload bit rate (nominal bit rate for Ethernet) | |  |
|---|---|---|---|---|---|
| | | | 10,000,000 | 9,952,149 | |
| | | | MAC bit rate (kbit/s), throughput (%) relative to maximum MAC bit rate | | |
| GFP-FCS | VLAN tag | MAC-size (bytes) | 10GBase-R | ODUflex (GFP), n = 8 Cm = 15230 | throughput |
| 0 | 0 | 64 | 8,311,688 | 8,846,354 | 100.0000 |
| 0 | 0 | 128 | 9,078,014 | 9,366,728 | 100.0000 |
| 0 | 0 | 256 | 9,516,729 | 9,650,569 | 100.0000 |
| 0 | 0 | 512 | 9,752,381 | 9,799,039 | 100.0000 |
| 0 | 0 | 1,024 | 9,874,638 | 9,875,000 | 100.0000 |
| 0 | 0 | 1,518 | 9,915,088 | 9,899,975 | 99.8476 |
| 0 | 0 | 9,618 | 9,986,502 | 9,943,878 | 99.5732 |
| 0 | 1 | 64 | 8,395,062 | 8,904,554 | 100.0000 |
| 0 | 1 | 128 | 9,103,448 | 9,383,455 | 100.0000 |
| 0 | 1 | 256 | 9,523,810 | 9,655,070 | 100.0000 |
| 0 | 1 | 512 | 9,754,253 | 9,800,208 | 100.0000 |
| 0 | 1 | 1,024 | 9,875,120 | 9,875,298 | 100.0000 |
| 0 | 1 | 1,518 | 9,915,309 | 9,900,111 | 99.8467 |
| 0 | 1 | 9,618 | 9,986,508 | 9,943,881 | 99.5732 |
| 1 | 0 | 64 | 8,311,688 | 8,380,757 | 100.0000 |
| 1 | 0 | 128 | 9,078,014 | 9,099,107 | 100.0000 |
| 1 | 0 | 256 | 9,516,729 | 9,506,530 | 99.8928 |
| 1 | 0 | 512 | 9,752,381 | 9,724,237 | 99.7114 |
| 1 | 0 | 1,024 | 9,874,638 | 9,836,873 | 99.6176 |
| 1 | 0 | 1,518 | 9,915,088 | 9,874,093 | 99.5865 |
| 1 | 0 | 9,618 | 9,986,502 | 9,939,747 | 99.5318 |

TABLE 2-continued

| | | | BPayload bit rate (nominal bit rate for Ethernet) | | |
|---|---|---|---|---|---|
| | | | 10,000,000 | 9,952,149 | |
| | | | MAC bit rate (kbit/s), throughput (%) relative to maximum MAC bit rate | | |
| GFP-FCS | VLAN tag | MAC-size (bytes) | 10GBase-R | ODUflex (GFP), n = 8 Cm = 15230 | throughput |
| 1 | 1 | 64 | 8,395,062 | 8,459,326 | 100.0000 |
| 1 | 1 | 128 | 9,103,448 | 9,122,803 | 100.0000 |
| 1 | 1 | 256 | 9,523,810 | 9,513,083 | 99.8874 |
| 1 | 1 | 512 | 9,754,253 | 9,725,964 | 99.7100 |
| 1 | 1 | 1,024 | 9,875,120 | 9,837,316 | 99.6172 |
| 1 | 1 | 1,518 | 9,915,309 | 9,874,296 | 99.5864 |
| 1 | 1 | 9,618 | 9,986,508 | 9,939,753 | 99.5318 |

For example, a size of an MAC frame may be average 1,518 bytes. When a size of the MAC frame does not exceed 1,518 bytes, an MAC bit rate that can be transmitted through 10 GBASE-R is 9,915,088 kbit/s. However, an MAC bit rate that can be transmitted through ODUflex (GFP), n=8 is 9,899,975 kbit/s. Accordingly, when a packet signal having a bit rate of 10 GBASE-R is transmitted through the ODUflex (GFP), n=8, the packet signal may not be processed with an efficiency of 100%.

Further, when a jumbo-frame of 9,618 bytes is transmitted, the packet signal is input by 9,986,502 kbit/s through 10 GBASE-R but can be transmitted to maximum 9,943,878 kbit/s through the ODUflex (GFP), n=8. In this way, an MAC signal of 10 Gbit/s or more cannot be completely transmitted through an optical transport network.

For example, while transmitting a packet signal through the ODUflex (GFP), n=6, when an MAC signal of 100 class should be transmitted, even if a size of the ODUflex (GFP) is hitlessly changed to ODUflex (GFP), n=8, it cannot be guaranteed that an MAC signal of 100 class is completely transmitted. Therefore, when a packet exceeds a capacity of the ODUflex (GFP), a packet damage problem such as delay or discard of the packet may occur. Therefore, it is necessary to increase a transport capacity of the packet.

FIG. 2A and FIG. 2B are a diagram illustrating an example of a method of resizing an ODUflex (GFP), n=6 to an ODUflex (GFP), n=8.

Referring to FIG. 2A, as shown in (a) of FIG. 2A, a packet client signal is mapped to a payload area of the ODUflex (GFP), n=6 through GFP encapsulation, and the ODUflex (GFP), n=6 is GMP mapped to 6 tributary slots (TS 1 to TS 6) within a payload area of a HO ODU2.

When trying to increase a transport capacity of a packet client signal to 10G class, as shown in (b) of FIG. 2A, the ODUflex (GFP), n=6 is GMP mapped to 8 tributary slots (TS 1 to TS 8) of the HO ODU2. In an area, except for an area in which the ODUflex (GFP), n=6 is actually mapped, because a stuff enters, packet damage does not occur in a GMP mapping apparatus.

After 8 tributary slots are secured, a bit rate of the ODUflex (GFP), n=6 is increased to a bit rate of the ODUflex (GFP), n=8, as shown in (c) of FIG. 2B. In this case, even if a bit rate is increased, an incoming packet capacity is equal to a previous packet capacity, and an idle pattern signal enters in addition to the packet capacity, and thus packet damage does not occur in a GFP processor.

Thereafter, as shown in (d) of FIG. 2B, when a capacity of a packet client signal to transmit is increased to 10G class, a transport capacity of the packet client signal is hitlessly increased.

However, when a size of an MAC frame is 1,518 bytes, a processing efficiency of the ODUflex (GFP), n=8 is 99.8476%, as shown in Table 2. Therefore, there is a problem that a packet client signal of 10G class cannot be completely transmitted.

FIG. 3 is a diagram illustrating a method of transmitting a packet according to an exemplary embodiment of the present invention.

Referring to FIG. 3, as shown in (a) of FIG. 3, when a packet client signal of 7.5 G class is transmitted through the ODUflex (GFP), n=6, a transport capacity of the packet client signal can be increased to 10G class.

For this purpose, as shown in (b) of FIG. 3, the packet client signal is mapped to a payload area of the HO ODU2 through direct GFP encapsulation. As shown in (c) of FIG. 3, the packet client signal is increased to 10G class. In this case, an MAC bit rate that can be transmitted through the HO ODU2 (GFP), which is a result when direct GFP encapsulation is performed in the payload area of the HO ODU2 is represented in Table 3.

TABLE 3

| | | | Payload bit rate (nominal bit rate for Ethernet) | | |
|---|---|---|---|---|---|
| | | | 10,000,000 | 9,995,277 | |
| | | | MAC bit rate (kbit/s), throughput (%) relative to maximum MAC bit rate | | |
| GFP-FCS | VLAN tag | MAC-size (bytes) | 10GBase-R | ODU2 | throughput |
| 0 | 0 | 64 | 8,311,688 | 8,884,691 | 100.0000 |
| 0 | 0 | 128 | 9,078,014 | 9,407,319 | 100.0000 |
| 0 | 0 | 256 | 9,516,729 | 9,692,390 | 100.0000 |
| 0 | 0 | 512 | 9,752,381 | 9,841,503 | 100.0000 |
| 0 | 0 | 1,024 | 9,874,638 | 9,917,794 | 100.0000 |
| 0 | 0 | 1,518 | 9,915,088 | 9,942,877 | 100.0000 |
| 0 | 0 | 9,618 | 9,986,502 | 9,986,970 | 100.0000 |
| 0 | 1 | 64 | 8,395,062 | 8,943,143 | 100.0000 |
| 0 | 1 | 128 | 9,103,448 | 9,424,118 | 100.0000 |
| 0 | 1 | 256 | 9,523,810 | 9,696,910 | 100.0000 |
| 0 | 1 | 512 | 9,754,253 | 9,842,677 | 100.0000 |
| 0 | 1 | 1,024 | 9,875,120 | 9,918,093 | 100.0000 |
| 0 | 1 | 1,518 | 9,915,309 | 9,943,014 | 100.0000 |
| 0 | 1 | 9,618 | 9,986,508 | 9,986,974 | 100.0000 |
| 1 | 0 | 64 | 8,311,688 | 8,417,075 | 100.0000 |
| 1 | 0 | 128 | 9,078,014 | 9,138,539 | 100.0000 |
| 1 | 0 | 256 | 9,516,729 | 9,547,727 | 100.0000 |
| 1 | 0 | 512 | 9,752,381 | 9,766,377 | 100.0000 |
| 1 | 0 | 1,024 | 9,874,638 | 9,879,502 | 100.0000 |
| 1 | 0 | 1,518 | 9,915,088 | 9,916,883 | 100.0000 |
| 1 | 0 | 9,618 | 9,986,502 | 9,982,822 | 99.9631 |
| 1 | 1 | 64 | 8,395,062 | 8,495,985 | 100.0000 |
| 1 | 1 | 128 | 9,103,448 | 9,162,337 | 100.0000 |
| 1 | 1 | 256 | 9,523,810 | 9,554,309 | 100.0000 |
| 1 | 1 | 512 | 9,754,253 | 9,768,112 | 100.0000 |
| 1 | 1 | 1,024 | 9,875,120 | 9,879,947 | 100.0000 |
| 1 | 1 | 1,518 | 9,915,309 | 9,917,087 | 100.0000 |
| 1 | 1 | 9,618 | 9,986,508 | 9,982,827 | 99.9631 |

Here, it can seen that a bit rate of the payload of the HO ODU2 is 9,995,277 kbit/s (=238/237×9,953,280 kbit/s) and is a bit rate of a payload higher than that of the ODUflex (GFP), n=8. This is because ODUflex OH is mapped to the HO ODU2 and thus a capacity that can transmit pure data reduces.

Referring to Table 3, when a size of an MAC frame is 1,518 bytes, an MAC bit rate that can be transmitted through 10 GBASE-R is 9,915,088 kbit/s, and an MAC bit rate that can be transmitted through the HO ODU2 (GFP) is 9,986,970 kbit/s. That is, because a bit rate of the HO ODU2 (GFP) is higher than that of 10 GBASE-R, a packet signal can be completely transmitted with an efficiency of 100% according to an exemplary embodiment of FIG. 3.

When a jumbo frame of 9,618 bytes is transmitted, an MAC bit rate that can be transmitted through 10 GBASE-R is 9,986,502 kbit/s. In a process of GFP encapsulating a packet client signal, when frame check sequence (FCS) is added, a maximum MAC bit rate that can be transmitted through the HO ODU2 (GFP) is 9,982,822 kbit/s, and when FCS is not added, a maximum MAC bit rate that can be transmitted through the HO ODU2 (GFP) is 9,986,970 kbit/s. Therefore, when trying to transmit a packet client signal of 100 class to an optical transport network, in a process of GFP encapsulating, when directly mapping to the HO ODU2 without adding FCS, packet damage can be prevented.

FIG. 4A and FIG. 4B are a diagram illustrating a method of transmitting a packet according to another exemplary embodiment of the present invention.

Referring to FIG. 4A and FIG. 4B, as shown in (a) to (d) of FIG. 2A and FIG. 2B, after the ODUflex (GFP), n=6 is resized to the ODUflex (GFP), n=8, as shown in (e) of FIG. 4B, a packet client signal is mapped to a payload area of the HO ODU2 through direct GFP encapsulation. As shown in (f) of FIG. 4B, the packet client signal is increased to 10G class.

A time period that is required for increasing a packet transport capacity increases, compared with an exemplary embodiment of FIG. 3, but the packet transport capacity can be more gradually increased or decreased. Further, when a function of switching HO ODU2 does not exist in an optical transport network, in order to provide compatibility of the network, it can be set to use the ODUflex (GFP), n=8 instead of the HO ODU2. Further, while the packet client signal is first transmitted to ODUflex (GFP), n=8, when data are filled to an overflow warning line at an elastic store or First In, First Out (FIFO) that stores the packet client signal, the packet client signal may be changed to transmit to the HO ODU2 (GFP).

FIGS. 5A and 5B are a diagram illustrating a method of transmitting a packet according to another exemplary embodiment of the present invention.

Referring to FIG. 5A and FIG. 5B, as shown in (a) to (d) of FIG. 2A and FIG. 2B, after ODUflex (GFP), n=6 is resized to ODUflex (GFP), n=8, as shown in (e) of FIG. 5B, a packet client signal is mapped to optical channel data tributary unit 2 with 8 tributary slots (ODTU2.8) through direct GFP encapsulating. ODTU2.8 is a tributary unit having 8 tributary slots. Thereafter, as shown in (f) of FIG. 5B, the packet client signal is increased to 10G class.

In this way, only pure data are GMP mapped to the HO ODU2 without an overhead of the ODUflex (GFP), n=8. When necessary information exists within the overhead of the ODUflex (GFP), n=8, the necessary information is copied and put to a HO ODU2 overhead. This can be performed because a final path in which the ODUflex (GFP), n=8 is transmitted and a final path in which HO ODU2 is transmitted are identical.

An MAC bit rate that is transmitted using a method that is illustrated in FIG. 5A and FIG. 5B is represented in Table 4.

A calculation result of an MAC bit rate that can be transmitted through ODTU2.8 (GFP) that is directly GFP encapsulated to a payload area of the ODTU2.8 is represented in Table 4.

TABLE 4

| | | | Payload bit rate (nominal bit rate for Ethernet) | | |
|---|---|---|---|---|---|
| | | | 10,000,000 | 9,993,965 | |
| | | | MAC bit rate (kbit/s), throughput (%) relative to maximum MAC bit rate | | |
| GFP-FCS | VLAN tag | MAC-size (bytes) | 10GBase-R | ODTU2.8 (GFP) | throughput |
| 0 | 0 | 64 | 8,311,688 | 8,883,524 | 100.0000 |
| 0 | 0 | 128 | 9,078,014 | 9,406,084 | 100.0000 |
| 0 | 0 | 256 | 9,516,729 | 9,691,117 | 100.0000 |
| 0 | 0 | 512 | 9,752,381 | 9,840,211 | 100.0000 |
| 0 | 0 | 1,024 | 9,874,638 | 9,916,492 | 100.0000 |
| 0 | 0 | 1,518 | 9,915,088 | 9,941,572 | 100.0000 |
| 0 | 0 | 9,618 | 9,986,502 | 9,985,659 | 99.9916 |
| 0 | 1 | 64 | 8,395,062 | 8,941,968 | 100.0000 |
| 0 | 1 | 128 | 9,103,448 | 9,422,881 | 100.0000 |
| 0 | 1 | 256 | 9,523,810 | 9,695,637 | 100.0000 |
| 0 | 1 | 512 | 9,754,253 | 9,841,385 | 100.0000 |
| 0 | 1 | 1,024 | 9,875,120 | 9,916,791 | 100.0000 |
| 0 | 1 | 1,518 | 9,915,309 | 9,941,709 | 100.0000 |
| 0 | 1 | 9,618 | 9,986,508 | 9,985,662 | 99.9915 |
| 1 | 0 | 64 | 8,311,688 | 8,415,970 | 100.0000 |
| 1 | 0 | 128 | 9,078,014 | 9,137,339 | 100.0000 |
| 1 | 0 | 256 | 9,516,729 | 9,546,474 | 100.0000 |
| 1 | 0 | 512 | 9,752,381 | 9,765,095 | 100.0000 |
| 1 | 0 | 1,024 | 9,874,638 | 9,878,204 | 100.0000 |
| 1 | 0 | 1,518 | 9,915,088 | 9,915,581 | 100.0000 |
| 1 | 0 | 9,618 | 9,986,502 | 9,981,511 | 99.9500 |
| 1 | 1 | 64 | 8,395,062 | 8,494,870 | 100.0000 |
| 1 | 1 | 128 | 9,103,448 | 9,161,134 | 100.0000 |
| 1 | 1 | 256 | 9,523,810 | 9,553,054 | 100.0000 |
| 1 | 1 | 512 | 9,754,253 | 9,766,829 | 100.0000 |
| 1 | 1 | 1,024 | 9,875,120 | 9,878,650 | 100.0000 |
| 1 | 1 | 1,518 | 9,915,309 | 9,915,785 | 100.0000 |
| 1 | 1 | 9,618 | 9,986,508 | 9,981,516 | 99.9500 |

Because the HO ODU2 includes 8 tributary slots, a bit rate per tributary slot is (1/8×a bit rate of a payload of HO ODU2). When ODTU2.8 including 8 tributary slots is GMP mapped to the payload of the HO ODU2, a bit rate of ODTU2.8 (GFP) is about 9,993,965 kbits (15230/15232×8×1/8×238/237×9, 953,280 kbit/s).

Referring to Table 4, when a size of an MAC frame is 1,518 bytes, an MAC bit rate that can be transmitted through 10 GBASE-R is 9,915,088 kbit/s, and an MAC bit rate that can be transmitted through ODTU2.8 (GFP) is 9,941,572 kbit/s. That is, because a bit rate of ODTU2.8 (GFP) is higher than that of 10 GBASE-R, a packet signal can be completely transmitted with an efficiency of 100% according to an exemplary embodiment of FIG. 5A and FIG. 5B.

However, when a jumbo frame of 9,618 bytes is transmitted, an MAC bit rate that can be transmitted through 10 GBASE-R is 9,986,502 kbit/s, and an MAC bit rate that can be transmitted through ODTU2.8 (GFP) is 9,985,662 kbits and thus some damage may occur. Therefore, in an optical transport network that uses an MAC frame of 1,518 bytes or less, a packet client signal of 10G class can be transmitted without packet damage according to an exemplary embodiment of FIG. 5A and FIG. 5B.

A method according to an exemplary embodiment of FIG. 5A and FIG. 5B has a transport capacity smaller than that according to an exemplary embodiment of FIG. 3, but there is a merit that a transport capacity can be dynamically increased while sustaining an existing GMP mapping method. That is, because a condition that GMP maps ODUflex (GFP), n=8 to HO ODU2 and a condition that GMP maps ODTU2.8 (GFP) to HO ODU2 are identical, a GMP processor can be continuously operated. Resultantly, when dynamically increasing or decreasing a packet transport capacity while alternately performing steps (e) and (f), a GMP buffer can be used as it is without requiring to empty or reset.

When transmitting a packet according to an exemplary embodiment of FIGS. 3, 4A, 4B, 5A, and 5B, a HO ODU (GFP) hitless resizing protocol is used.

FIG. 6 is a diagram illustrating a structure of an OPUk overhead for a HO ODU (GFP) hitless resizing protocol according to an exemplary embodiment of the present invention.

Referring to FIG. 6, the OPUk overhead is positioned at a fifteenth column to a sixteenth column, and a resizing protocol overhead is positioned at a first row to a third row of the fifteenth column. When a corresponding area is used as a resizing protocol overhead, RP is set to 1, and when use of a resizing protocol overhead is terminated, RP may be set to 0. A fourth bit to an eighth bit (ODUflex link connection) of a first row to a second row of a resizing protocol overhead determine the number of tributary slots that are occupied by ODUflex within HO ODUk and use the number in order to set a link connection. A first bit to a third bit (ODUflex rate resizing) of a second row are used for increasing and decreasing a transmission speed of ODUflex.

For a HO ODU (GFP) hitless resizing protocol, a 1 bit over-resizing (OR) signal is added to a signal for an existing ODUflex (GFP) hitless resizing protocol.

For example, when a packet client signal is transmitted through ODUflex (GFP), n=6, in order to increase a transport capacity of the packet client signal to 10G class, it is assumed that 8 tributary slots are increased. In this case, when a packet transport capacity is increased to ODUflex (GFP), n=8, OR is set to 0. When OR is set to 0, an ODUflex (GFP) hitless resizing protocol is used. That is, after a link capacity is secured so that the ODUflex (GFP), n=6 is GMP mapped to 8 tributary slots using 10 bits corresponding to an ODUflex link connection, a bit rate of the ODUflex (GFP), n=6 is increased to a bit rate of the ODUflex (GFP), n=8 using 3 bits corresponding to ODUflex rate resizing.

As another example, when OR is set to 1, it is assumed that a packet signal is mapped to HO ODU2 (GFP) through direct GFP encapsulation according to an exemplary embodiment of FIG. 3. When OR is set to 1, it is determined whether the packet signal can be directly mapped to HO ODU2 (GFP) using 10 bits corresponding to an ODUflex link connection. After it is determined that there is no problem when a packet signal is converted to HO ODU2 (GFP) at a path of an entire HO ODU using 3 bits corresponding to ODUflex rate resizing, the packet signal is directly mapped to HO ODU2 (GFP) or HO ODTU2.8 (GFP).

As another example, when OR is set to 1, after the ODUflex, n=6 is resized to the ODUflex, n=8 according to an exemplary embodiment of FIG. 4A and FIG. 4B, it is assumed that the packet signal is directly mapped to the HO ODU2 (GFP). When OR is set to 1, it is determined whether a packet signal can be directly mapped to the HO ODU2 (GFP) using 10 bits corresponding to an ODUflex link connection, and a link capacity is secured so that ODUflex, n=6 are GMP mapped to 8 tributary slots. It is determined that there is no problem when a packet signal is converted to HO ODU2 (GFP) at a path of an entire HO ODU using 3 bits corresponding to ODUflex rate resizing, a transmission speed of the ODUflex (GFP), n=6 is increased to that of the ODUflex (GFP), n=8, and then the packet signal is directly mapped to the HO ODU2 (GFP).

As another example, when OR is set to 1, after the ODUflex, n=6 is resized to the ODUflex, n=8 according to an exemplary embodiment of FIG. 5A and FIG. 5B, it is assumed that a packet signal is directly mapped to ODTU2.8 (GFP). When OR is set to 1, it is determined whether a packet signal can be directly mapped to ODTU2.8 (GFP) using 10 bits corresponding to an ODUflex link connection, and a link capacity is secured so that the ODUflex, n=6 is GMP mapped to 8 tributary slots. It is determined that there is no problem when a packet signal is converted to ODTU2.8 (GFP) at a path of an entire HO ODU using 3 bits corresponding to ODUflex rate resizing, a transmission speed of the ODUflex (GFP), n=6 is increased to that of the ODUflex (GFP), n=8, and then the packet signal is directly mapped to ODTU2.8 (GFP).

FIG. 7 is a block diagram illustrating a configuration of a packet transport apparatus using ODUflex (GFP).

Referring to FIG. 7, a packet transport apparatus 700 includes a FIFO 710, a GFP processor 720, an ODUflex generator 730, an ODTU2.ts multiplexer 740, and an OTU2/ODU2 mapper 750.

The FIFO 710 receives and stores a packet client signal. The GFP processor 720 GFP encapsulates a packet client signal. The ODUflex generator 730 maps a GFP frame to an ODUflex and adds an ODUflex overhead to the GFP frame. The ODTU2.ts multiplexer 740 GMP maps each of at least one ODUflex to ODTU2.ts and multiplexes the ODUflexs. Here, is the number of GMP mapped tributary slots. The OTU2/ODU2 mapper 750 maps ODTU2.ts to an ODU2 payload area, adds an ODU2 overhead to the ODTU2.ts and transmits ODU2, or adds and transmits an ODU2 overhead and an OTU2 overhead to the ODTU2.ts.

Figure 8:
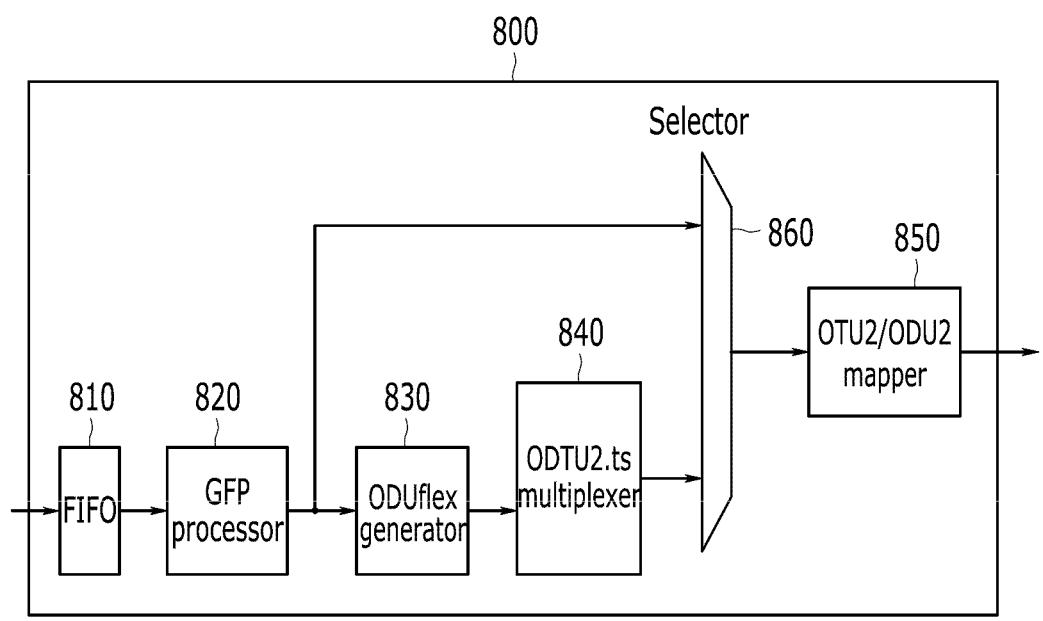
FIG. 8 is a block diagram illustrating a configuration of a packet transport apparatus using an ODUflex (GFP) and an ODU2 (GFP) according to an exemplary embodiment of the present invention.

FIG. 8 is a block diagram illustrating a configuration of a packet transport apparatus using ODUflex (GFP) and ODU2 (GFP) according to an exemplary embodiment of the present invention.

Referring to FIG. 8, a packet transport apparatus 800 includes a FIFO 810, a GFP processor 820, an ODUflex generator 830, an ODTU2.ts multiplexer 840, an OTU2/ODU2 mapper 850, and a selector 860.

The FIFO 810, the GFP processor 820, the ODUflex generator 830, the ODTU2.ts multiplexer 840, and the OTU2/ODU2 mapper 850 correspond to the FIFO 710, the GFP processor 720, the ODUflex generator 730, the ODTU2.ts multiplexer 740, and the OTU2/ODU2 mapper 750 of FIG. 7 and therefore a detailed description thereof will be omitted.

The selector 860 selects an ODUflex (GFP) and an ODU2 (GFP). When the selector 860 selects data that are output from the ODTU2.ts multiplexer 840, the selector 860 maps a GFP encapsulated GFP frame to ODUflex and thus provides a transport capacity of the ODUflex (GFP). When the selector 860 selects data that are output from the GFP processor 820, a GFP encapsulated GFP frame is directly mapped to ODU2 and thus a transport capacity of the ODU2 (GFP) is provided.

Figure 9:
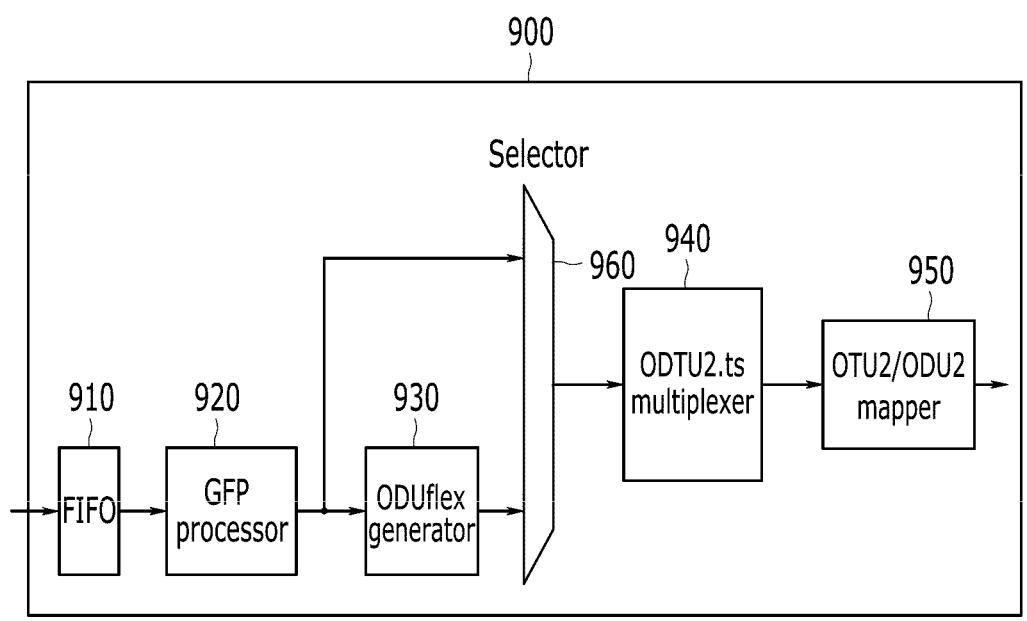
FIG. 9 is a block diagram illustrating a configuration of a packet transport apparatus using an ODUflex (GFP) and an ODTU2.8 (GFP) according to an exemplary embodiment of the present invention.

FIG. 9 is a block diagram illustrating a configuration of a packet transport apparatus using ODUflex (GFP) and ODTU2.8 (GFP) according to an exemplary embodiment of the present invention.

Referring to FIG. 9, a packet transport apparatus 900 includes a FIFO 910, a GFP processor 920, an ODUflex generator 930, an ODTU2.ts multiplexer 940, an OTU2/ODU2 mapper 950, and a selector 960.

The FIFO 910, the GFP processor 920, the ODUflex generator 930, the ODTU2.ts multiplexer 940, and the OTU2/ODU2 mapper 950 correspond to the FIFO 710, the GFP processor 720, the ODUflex generator 730, the ODTU2.ts multiplexer 740, and the OTU2/ODU2 mapper 750 of FIG. 7, and therefore a detailed description thereof will be omitted.

The selector 960 selects ODUflex (GFP) and ODTU2.8 (GFP). When the selector 960 selects data that are output from the ODUflex generator 930, a GFP encapsulated GFP frame is mapped to the ODUflex and thus a transport capacity of the ODUflex (GFP) is provided. When the selector 960 selects data that are output from the GFP processor 920, a GFP encapsulated GFP frame is mapped to ODTU2.8 and thus a transport capacity of ODTU2.8 (GFP) is provided.

It is to GMP map only pure data to ODU2 without an overhead of ODUflex (GFP), n=8 to provide a transport capacity of ODTU2.8 (GFP). Therefore, when necessary information exists in an overhead of ODUflex (GFP), n=8, by transferring information of the ODUflex generator 930 to the OTU2/ODU2 mapper 850, the information can be copied, put, and transmitted to a HO ODU2 overhead. This can be performed because a final path in which ODUflex (GFP), n=8 is transmitted and a final path in which an LO ODU2 is transmitted are identical.

Figure 10:
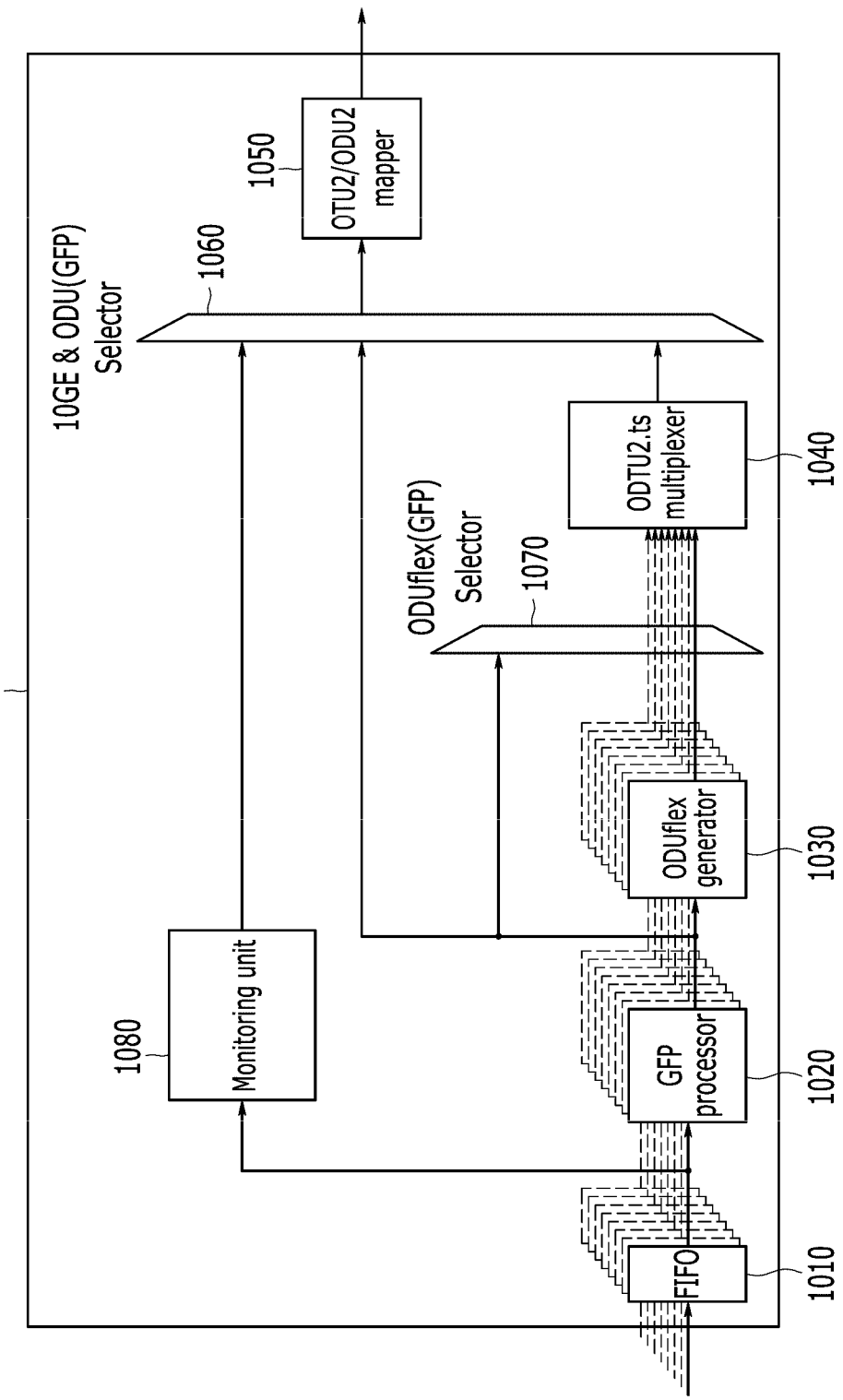
FIG. 10 is a block diagram illustrating a configuration of a packet transport apparatus according to an exemplary embodiment of the present invention.

FIG. 10 is a block diagram illustrating a configuration of a packet transport apparatus according to an exemplary embodiment of the present invention.

Referring to FIG. 10, a packet transport apparatus 1000 includes a FIFO 1010, a GFP processor 1020, an ODUflex generator 1030, an ODTU2.ts multiplexer 1040, an OTU2/ODU2 mapper 1050, a 10G & ODU (GFP) selector 1060, an ODUflex (GFP) selector 1070, and a monitoring unit 1080.

The FIFO 1010, the GFP processor 1020, the ODUflex generator 1030, the ODTU2.ts multiplexer 1040, and the OTU2/ODU2 mapper 1050 correspond to the FIFO 710, the GFP processor 720, the ODUflex generator 730, the ODTU2.ts multiplexer 740, and the OTU2/ODU2 mapper 750 of FIG. 7 and therefore a detailed description thereof will be omitted.

When the 10G & ODU (GFP) selector 1060 directly receives a GBASE-R signal as a packet client signal, the 10G & ODU (GFP) selector 1060 can directly map the 10 GBASE-R signal to ODU2 without through the GFP processor 1020. However, because the ODU2 has a low bit rate that cannot directly map a 10 GBASE-R signal, it is necessary to further increase a bit rate of the ODU2. The monitoring unit 1080 performs performance and fault monitoring of the received 10 GBASE-R signal. Further, when a fault is detected in the monitoring unit 1080, the monitoring unit 1080 can generate a signal (for example, local fault) that indicates to a far-end terminal that a fault is detected during receiving a 10 GBASE-R signal FIG. 11 is a block diagram illustrating a configuration of an LO ODU switching apparatus and an OTU2 packet transport apparatus using an ODUflex (GFP).

Figure 11:
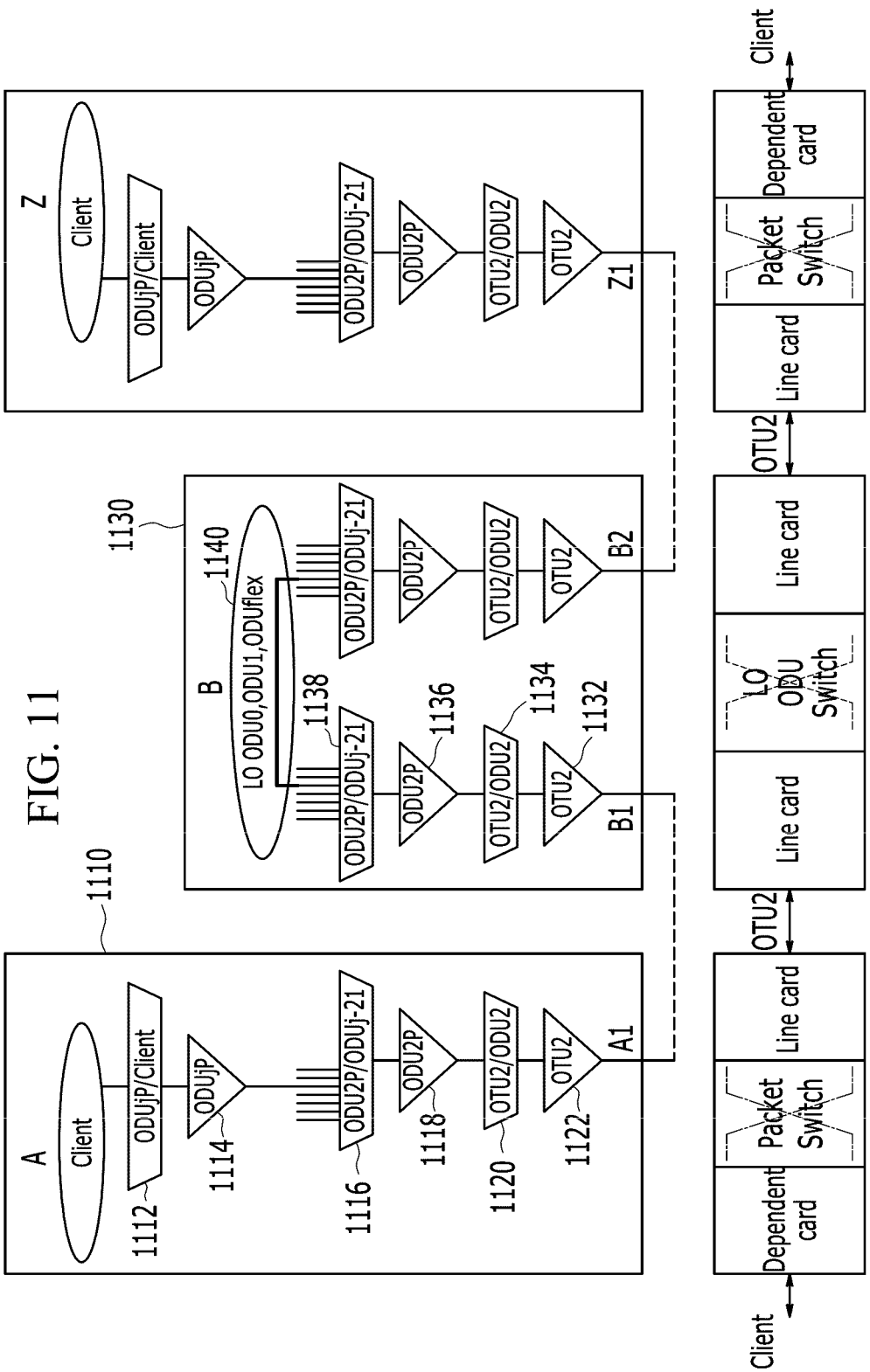
FIG. 11 is a block diagram illustrating a configuration of an LO ODU switching apparatus and an OTU2 packet transport apparatus using an ODUflex (GFP).

Referring to FIG. 11, a packet transport apparatus 1110 receives a packet client signal, performs packet switching, and then transmits an OTU2 signal to an optical transport network through a line card.

The line card maps a switched packet client signal to ODUflex (GFP) through GFP mapping in an ODUjP/Client adaptation block 1112 and inserts an overhead of the ODUflex (GFP) in an ODUjP termination block 1114. The line card multiplexes the ODUflex (GFP) to a tributary slot of the ODU2 through GMP mapping in an ODU2P/ODUj-21 adaptation block 1116 and inserts an ODU2 overhead signal in an ODU2P termination block 1118. The line card maps an ODU2 signal to an OTU2 signal in an OTU2/ODU2 adaptation block 1120 and inserts an OTU2 overhead signal in an OTU2 termination block 1122.

A receiving process is performed in a reverse order of the transmitting process.

An LO ODU switching apparatus 1130 enables to more efficiently use a network by switching a signal of an LO ODU, for example, ODU0, ODU1, and ODUflex in an optical transport network. A line card of the LO ODU switching apparatus 1130 terminates an overhead of a received OTU2 in an OTU2 termination block 1132 and demaps an ODU2 signal from an OTU2 signal in an OTU2/ODU2 adaptation block 1134. The line card terminates an overhead of ODU2 in an ODU2P termination block 1136 and extracts one of ODUflex (GFP), ODU0, and ODU1 from a tributary slot of ODU2 through GMP demapping in an ODU2P/ODUj-21 adaptation block 1138. An LO ODU switching block 1140 switches in a signal unit of one of ODUflex (GFP), ODU0, and ODU1.

A transmitting process of LO ODU switching apparatuses ODU0, ODU1, and ODUflex is performed in a reverse order of the receiving process.

Referring to FIG. 11, a packet can be hitlessly dynamically transmitted only through ODUflex (GFP). Therefore, when trying to transmit a packet client signal of 10G class, ODUflex (GFP), n=8 is used and thus packet damage may occur. However, because ODU2 (GFP) or ODTU2.8 (GFP) cannot be switched in the LO ODU switching apparatus, a method of transmitting a packet according to an exemplary embodiment of the present invention cannot be applied to a network of FIG. 11.

Figure 12:
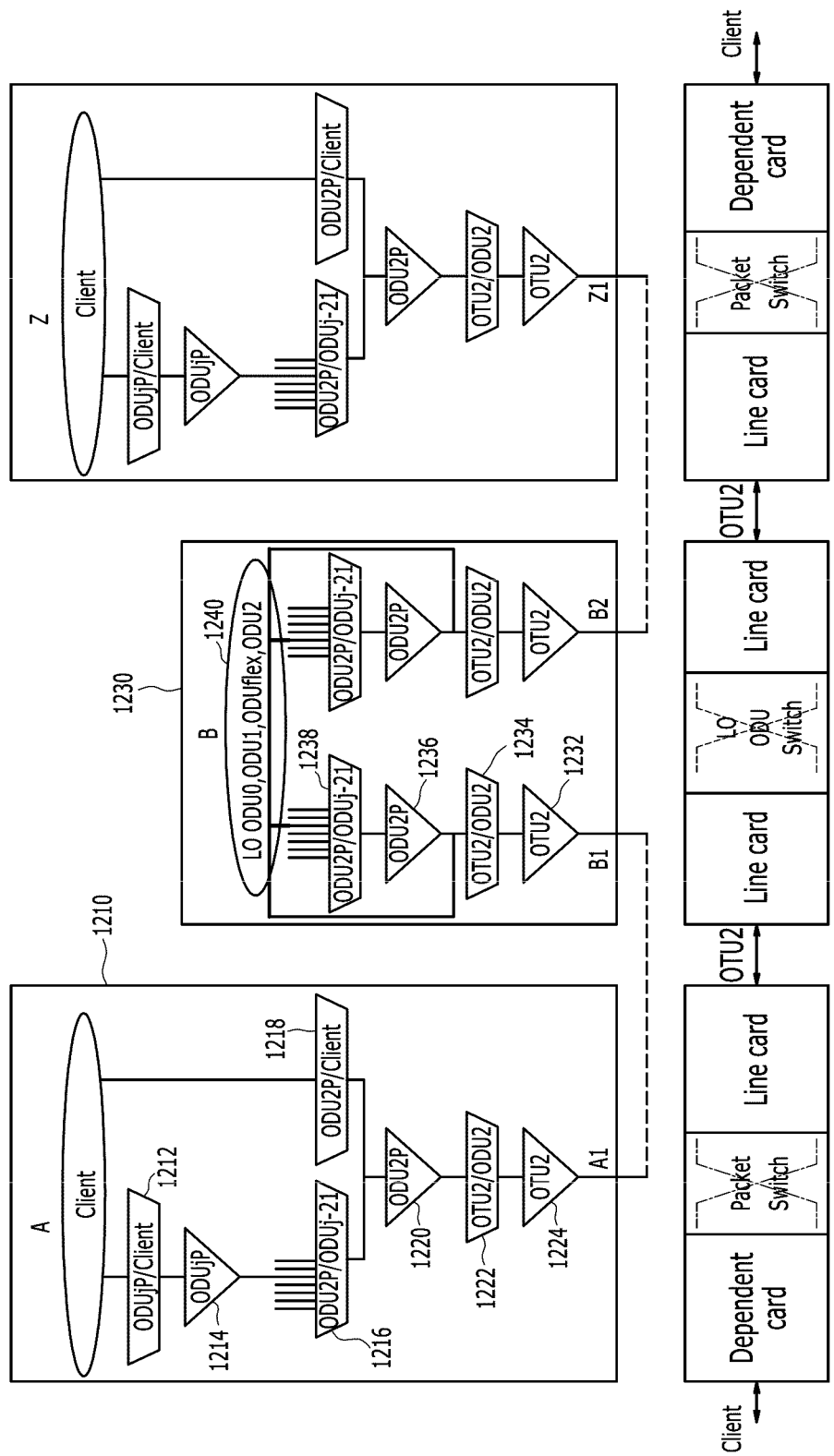
FIG. 12 is a block diagram illustrating a configuration of an OTU2 packet transport apparatus and an LO ODU switching apparatus according to an exemplary embodiment of the present invention.

FIG. 12 is a block diagram illustrating a configuration of an OTU2 packet transport apparatus and an LO ODU switching apparatus according to an exemplary embodiment of the present invention.

Referring to FIG. 12, a packet transport apparatus 1210 receives a packet client signal, performs packet switching, and then transmits an OTU2 signal to an optical transport network through a line card.

The line card maps a switched packet client signal to ODUflex (GFP) through GFP mapping in an ODUjP/Client adaptation block 1212 and inserts an overhead of ODUflex (GFP) in an ODUjP termination block 1214. The line card multiplexes the ODUflex (GFP) to a tributary slot of ODU2 through GMP mapping in an ODU2P/ODUj-21 adaptation block 1216, maps a switched packet client signal to the ODU2 (GFP) through GFP mapping in an ODU2P/Client adaptation block 1218, and selects an ODU2 signal in which an ODUflex (GFP) signal is multiplexed or an ODU2 signal in which a GFP signal is mapped and inserts an ODU2 overhead into the ODU2 signal in an ODU2P termination block 1220. The line card maps an ODU2 signal to an OTU2 signal in an OTU2/ODU2 adaptation block 1222 and inserts an OTU2 overhead signal in an OTU2 termination block 1224.

A receiving process is performed in a reverse order of the transmitting process.

An LO ODU switching apparatus 1230 enables to more efficiently use a network by switching a signal of a LO ODU, for example, ODU0, ODU1, ODUflex, and ODU2 in an optical transport network. A line card of the LO ODU switching apparatus 1230 terminates an overhead of a received OTU2 signal in an OTU2 termination block 1232, demaps an ODU2 signal from an OTU2 signal in an OTU2/ODU2 adaptation block 1234, and then transmits the OTU2 signal to an LO ODU switching block 1240 or transmits the OTU2 signal to an ODU2P termination block 1236. The line card terminates an ODU2 overhead in an ODU2P termination block 1236 and extracts one of ODUflex (GFP), ODU0, and ODU1 from a tributary slot of the ODU2 through GMP demapping in an ODU2P/ODUj-21 adaptation block 1238. The LO ODU switching block 1240 switches in a unit of one of an ODU2 signal that receives from the OTU2/ODU2 adaptation block 1234 and ODUflex (GFP), ODU0, and ODU1 signals that receive from the ODU2P/ODUj-21 adaptation block 1238.

A transmitting process of LO ODU switching apparatuses ODU0, ODU1, ODUflex, and ODU2 is performed in a reverse order of the receiving process.

Referring to FIG. 12, a packet can be dynamically transmitted without packet damage through ODU2 (GFP) and ODTU2.8 (GFP) as well as ODUflex (GFP). Therefore, when trying to transmit a packet client signal of 10G class, the packet client signal can be transmitted through ODU2 (GFP) or ODTU2.8 (GFP) and thus packet damage does not occur.

In this way, when a path that directly transmits an ODU2 signal that is extracted from an OTU2/ODU2 adaptation block to an LO ODU switching (ODU0, ODU1, ODUflex, and ODU2) block and an apparatus that switches in an unit of an ODU2 are provided, the signal can be transmitted to ODU2 (GFP) or ODTU2.8 (GFP) through an ODU (GFP) hitless protocol.

Figure 13:
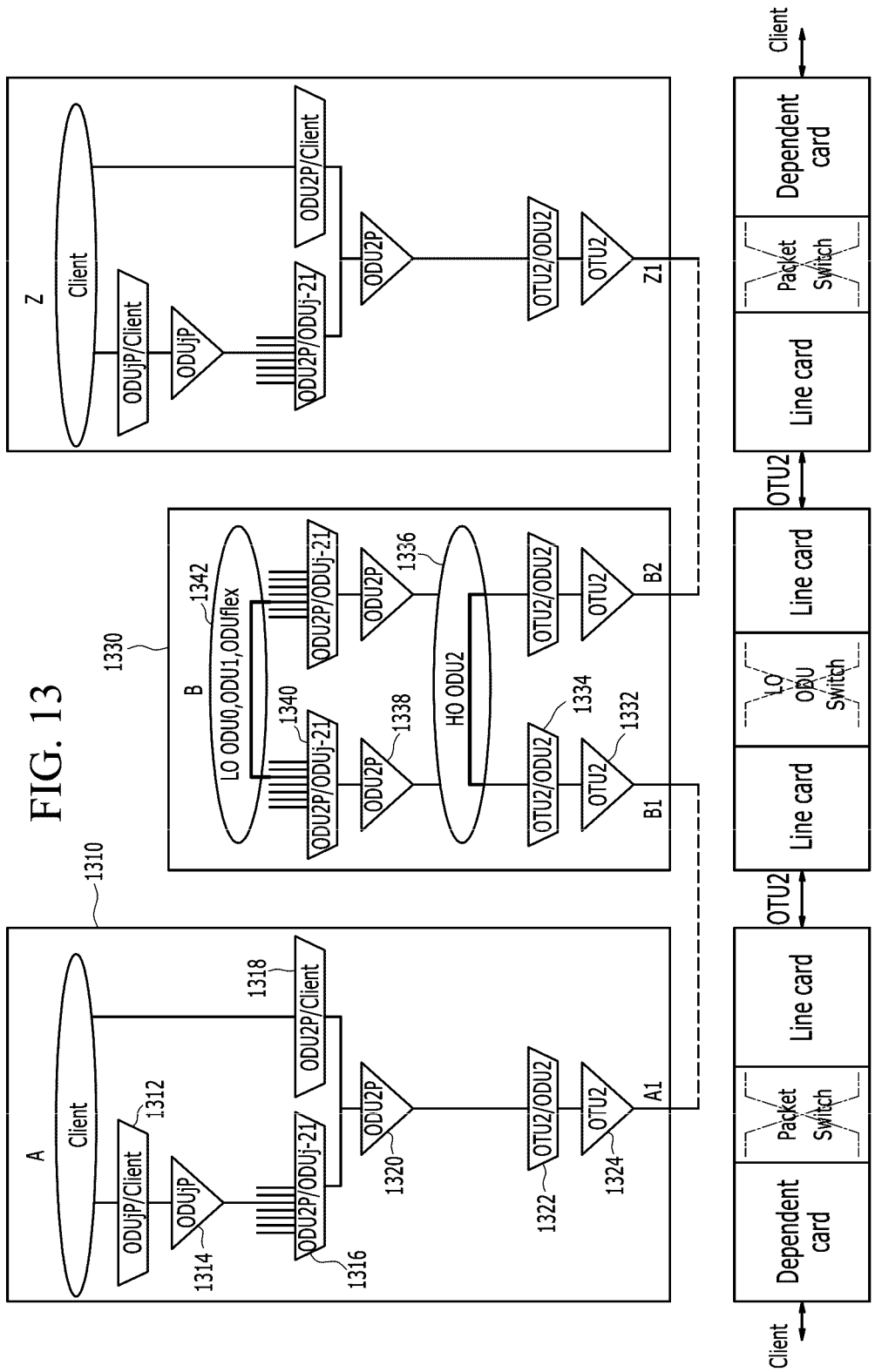
FIG. 13 is a block diagram illustrating a configuration of an OTU2 packet transport apparatus and a HO ODU2 and LO ODU switching apparatus according to another exemplary embodiment of the present invention.

FIG. 13 is a block diagram illustrating a configuration of an OTU2 packet transport apparatus and a HO ODU2 and LO ODU switching apparatus according to another exemplary embodiment of the present invention.

Referring to FIG. 13, a packet transport apparatus 1310 is identical to the packet transport apparatus 1210 of FIG. 12 and therefore a detailed description thereof will be omitted.

A HO ODU2 and LO ODU switching apparatus 1330 enables more efficiently to use a network by switching a signal of an LO ODU, for example, ODU0, ODU1, and ODUflex and HO ODU2 in an optical transport network. A line card of the HO ODU2 and LO ODU switching apparatus 1330 terminates an overhead of a received OTU2 signal in an OTU2 termination block 1332, and demaps an ODU2 signal from an OTU2 signal in an OTU2/ODU2 adaptation block 1334, and then transfers the signal to a HO ODU2 switching block 1336. The line card switches an ODU2 signal that receives from the OTU2/ODU2 adaptation block 1334 in the HO ODU2 switching block 1336 and transmits the ODU2 signal to an ODU2P termination block 1338 or transmits the ODU2 signal to the OTU2/ODU2 adaptation block 1334 in order to retransmit to the OTU2. The line card terminates an ODU2 overhead signal in the ODU2P termination block 1338 and extracts one of ODUflex (GFP), ODU0, and ODU1 from a tributary slot of ODU2 through GMP demapping in an ODU2P/ODUj-21 adaptation block 1340. An LO ODU switching block 1342 switches in a unit of one of ODUflex (GFP), ODU0, and ODU1 signals that receive from the ODU2P/ODUj-21 adaptation block 1340.

A transmitting process of LO ODU switching apparatuses ODU0, ODU1, and ODUflex is performed in a reverse order of the receiving process.

Referring to FIG. 13, a packet can be dynamically transmitted without packet damage through ODU2 (GFP) and ODTU2.8 (GFP) as well as ODUflex (GFP). Therefore, when trying to transmit a packet client signal of 10G class, the packet client signal can be transmitted through ODU2 (GFP) or ODTU2.8 (GFP), and packet damage does not occur.

In this way, when a path that directly transmits an ODU2 signal that is extracted from the OTU2/ODU2 adaptation block to the HO ODU2 switching block and an apparatus that switches in a unit of ODU2 are provided, the signal can be transmitted to ODU2 (GFP) or ODTU2.8 (GFP) through an ODU (GFP) hitless protocol.

Figure 14:
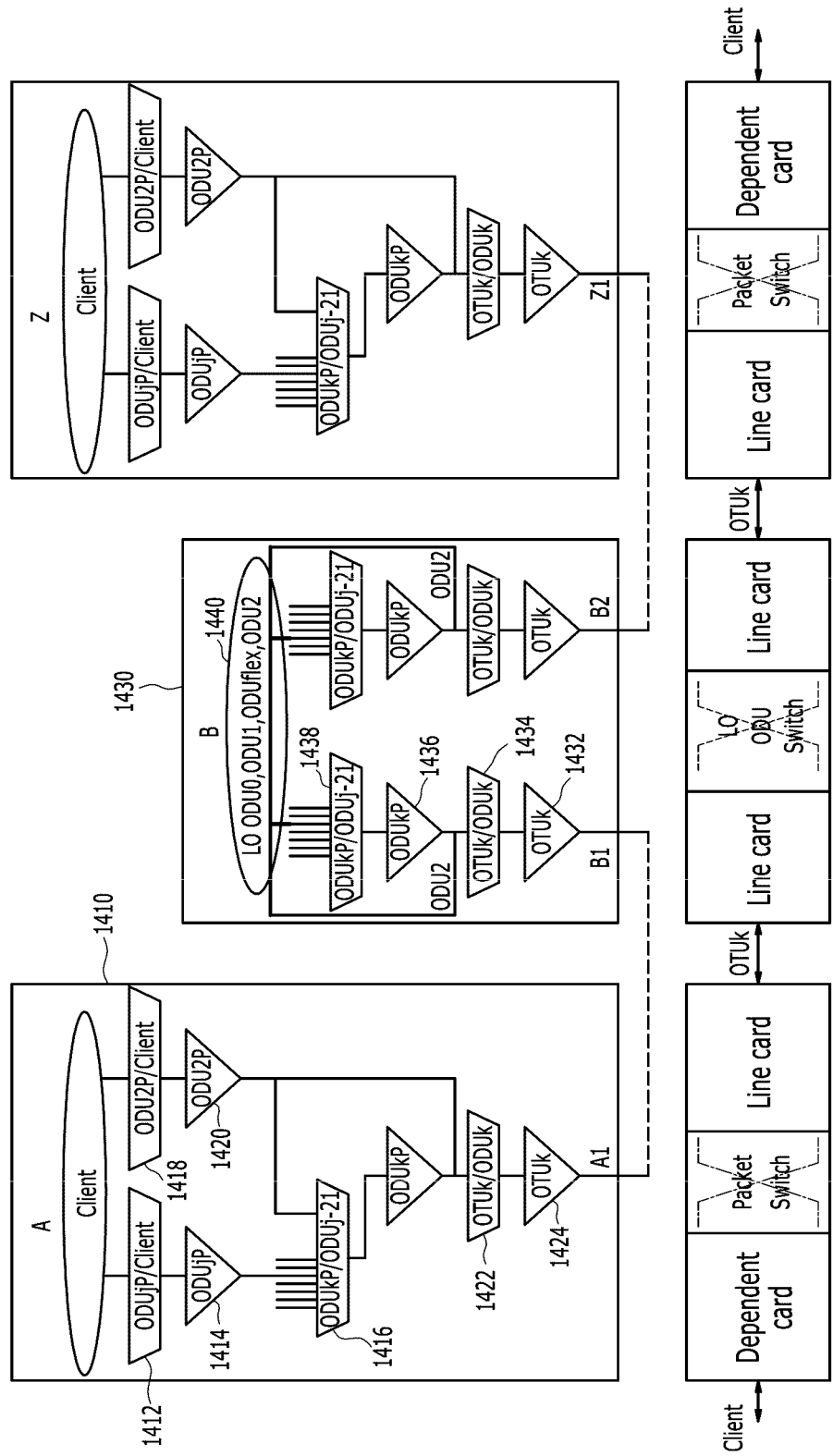
FIG. 14 is a block diagram illustrating a configuration of an OTUk (k=2, 3, 4) packet transport apparatus and an LO ODU switching apparatus according to an exemplary embodiment of the present invention.

FIG. 14 is a block diagram illustrating a configuration of an OTUk (k=2, 3, 4) packet transport apparatus and an LO ODU switching apparatus according to an exemplary embodiment of the present invention.

Referring to FIG. 14, an OTUk (k=2, 3, 4) packet transport apparatus 1410 receives a packet client signal, performs packet switching, and then transmits an OTUk (k=2, 3, 4) signal to an optical transport network through a line card.

The line card maps a switched packet client signal to ODUflex (GFP) through GFP mapping in an ODUjP/Client adaptation block 1412 and inserts an overhead of ODUflex (GFP) in an ODUjP termination block 1414.

The line card maps a switched packet client signal to an ODU2 (GFP) through GFP mapping in an ODU2P/Client adaptation block 1418 and inserts an overhead of ODU2 (GFP) in an ODU2P termination block 1420.

The line card multiplexes ODUflex (GFP) that is generated in the ODUjP termination block 1414 to a tributary slot of an ODUk (k=2, 3, 4) through GMP mapping in the ODUkP/ODUj-21 adaptation block 1416 or multiplexes a generated ODU2 (GFP) to a tributary slot of ODUk (k=3, 4) through GMP mapping in the ODU2P termination block 1420 and inserts an ODUk overhead signal in an ODUkP termination block 1417.

The line card maps an ODUk (k=2, 3, 4) signal in which an ODUflex (GFP) signal is multiplexed or maps an ODUk (k=3, 4) signal in which ODU2 (GFP) is multiplexed to an OTUk (k=2, 3, 4) signal in an OTUk/ODUk adaptation block 1422 or maps an ODU2 signal to which a GFP signal is mapped to an OTU2 signal and inserts an OTUk (k=2, 3, 4) overhead signal in an OTUk termination block 1424.

A receiving process is performed in a reverse order of the transmitting process.

An LO ODU switching apparatus 1430 enables to more efficiently use a network by switching a signal of an LO ODU, for example, ODU0, ODU1, ODUflex, and ODU2 in an optical transport network. A line card of the LO ODU switching apparatus terminates an overhead of a received OTUk (k=2, 3, 4) signal in an OTUk termination block 1432, demaps an ODUk (k=2, 3, 4) signal from an OTUk (k=2, 3, 4) signal in the OTUk/ODUk adaptation block 1434, and then directly transmits an ODU2 signal to an LO ODU switching block 1440 or transmits an ODU2 signal to an ODUkP termination block 1436, and transmits an ODU3 or ODU4 signal to the ODUkP termination block 1436. The line card terminates an ODUk (k=2, 3, 4) overhead in the ODUkP termination block 1436, and extracts one of ODUflex, ODU0, ODU1, and ODU2 from a tributary slot of the ODUk through GMP demapping in an ODUkP/ODUj-21 adaptation block 1438. The LO ODU switching block 1440 switches in a unit of one of an ODU2 signal that receives from the OTUk/ODUk block 1434 and ODUflex, ODU0, ODU1, and ODU2 signals that receive from the ODUkP/ODUj-21 adaptation block 1438.

A transmitting process of LO ODU switching apparatuses ODU0, ODU1, ODUflex, and ODU2 is performed in a reverse order of the receiving process.

Referring to FIG. 14, a packet can be dynamically transmitted without packet damage through ODU2 (GFP) and ODTU2.8 (GFP) as well as ODUflex (GFP) even in a network in which OTU2, OTU3, and OTU4 packet transport apparatuses are mixed. Therefore, when trying to transmit a packet client signal of 10G class, the packet client signal can be transmitted through ODU2 (GFP) or ODTU2.8 (GFP) and thus packet damage does not occur.

In this way, when a path that directly transfers an ODU2 signal that is extracted from an OTUk/ODUk adaptation block to an LO ODU switching (ODU0, ODU1, ODUflex, and ODU2) block and an apparatus that switches in a unit of ODU2 are provided, the signal can be transmitted to ODU2 (GFP) or ODTU2.8 (GFP) through an ODUflex (GFP) hitless protocol and an ODU (GFP) hitless protocol.

An exemplary embodiment of the present invention may be not only embodied through an apparatus and method but also embodied through a program that executes a function corresponding to a configuration of the exemplary embodiment of the present invention or through a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of transmitting a packet in an optical transport network, the method comprising:
   generating, by a packet transport apparatus, a first high order transport unit using a first high order data unit in an order higher than that of a dynamic data unit;
   transmitting, by the packet transport apparatus, the first high order transport unit to a switching apparatus;
   extracting, by a first line card of the switching apparatus, the first high order data unit from the first high order transport unit;
   extracting, by the first line card of the switching apparatus, a lower order data unit in an order lower than that of the first high order data unit from tributary slots of the first high order data unit;
   switching, by a switching unit of the switching apparatus, in a signal unit of the extracted lower order data unit using the extracted lower order data unit;
   mapping, by a second line card of the switching apparatus, the switched lower order data unit to tributary slots of a second high order data unit in an order the same as that of the first high order data unit;
   generating, by the second line card of the switching apparatus, a second high order transport unit using the mapped second high order data unit; and
   transmitting, by the second line card of the switching apparatus, the second high order transport unit.

2. The method of claim 1, wherein the generating a first high order transport unit comprises:
   generating a generic framing procedure (GFP) frame by GFP encapsulating a packet client signal;
   mapping the GFP frame to the dynamic data unit;
   selecting either the GFP frame before it was mapped or the dynamic data unit;
   multiplexing the selected GFP frame or dynamic data unit to the first high order data unit; and
   generating the first high order transport unit using the first high order data unit.

3. The method of claim 2, wherein the first high order data unit comprises an over-resizing notification signal for enabling hitless resizing.

* * * * *